United States Patent [19]

Delon et al.

[11] Patent Number: 4,994,290

[45] Date of Patent: Feb. 19, 1991

[54] CLARIFICATION METHOD FOR GRAPE MUST, AND THE MUST THUS OBTAINED

[75] Inventors: Michel Delon, Bordeaux; René Wajsfelner, Fresnes, both of France

[73] Assignees: Degremont, Rueil Malmaison; Chateau Leoville Las Cases, Pauillac, both of France

[21] Appl. No.: 398,061

[22] Filed: Aug. 24, 1989

[30] Foreign Application Priority Data

Aug. 30, 1988 [FR] France ................... 88 11366

[51] Int. Cl.$^5$ .............................................. A23L 2/04
[52] U.S. Cl. ................... 426/330.5; 426/599
[58] Field of Search .......... 426/330.4, 15, 330.5, 426/599, 424, 489, 478

[56] References Cited

U.S. PATENT DOCUMENTS

| | | | |
|---|---|---|---|
| 2,536,993 | 1/1951 | Cremaschi | 426/15 |
| 2,811,448 | 10/1957 | Rietz | 426/15 |
| 2,813,026 | 11/1957 | Mercilly | 426/15 |
| 3,169,873 | 2/1965 | Clark | 426/489 |
| 3,634,128 | 1/1972 | Bolen | 426/330.5 |
| 3,741,770 | 6/1973 | Olphen | 426/15 |
| 3,826,849 | 7/1974 | Venter | 426/15 |
| 3,900,571 | 8/1975 | Johnson | 426/15 |
| 4,162,972 | 7/1979 | Green | 426/498 |
| 4,620,980 | 11/1986 | Dumont | 426/330.5 |
| 4,794,013 | 12/1988 | Gresch | 426/51 |
| 4,874,615 | 10/1989 | Greenhoff | 426/489 |
| 4,889,743 | 12/1989 | Tazawa | 426/330.4 |
| 4,891,236 | 1/1990 | Ohta | 426/330.4 |

FOREIGN PATENT DOCUMENTS

| | | | |
|---|---|---|---|
| 3716178 | 6/1978 | Australia . | |
| 0137671 | 4/1985 | European Pat. Off. | 426/599 |
| 2264491 | 3/1978 | France . | |
| 432191 | 4/1975 | U.S.S.R. | 426/330.4 |
| 1294332 | 3/1987 | U.S.S.R. | 426/599 |
| 1391575 | 4/1988 | U.S.S.R. | 426/599 |

OTHER PUBLICATIONS

Chemical Engineering, vol. 85, No. 9, Apr. 1978, pp. 89–90, "Membrane Systems Make . . .".

*Primary Examiner*—Carolyn Paden
*Attorney, Agent, or Firm*—Roland Plottel

[57] ABSTRACT

A method for clarification and concentration of grape musts. Harvested and picked-up and crushed grapes are placed in a vinification vat, from which comes a must. The must then passes on to an apparatus where the solid phase and the liquid phase of the must are separated; and then the liquid phase is introduced into a flotation apparatus where it is clarified. The clarified must is then conveyed to a vat connected to a reverse osmosis concentration loop.

14 Claims, 1 Drawing Sheet

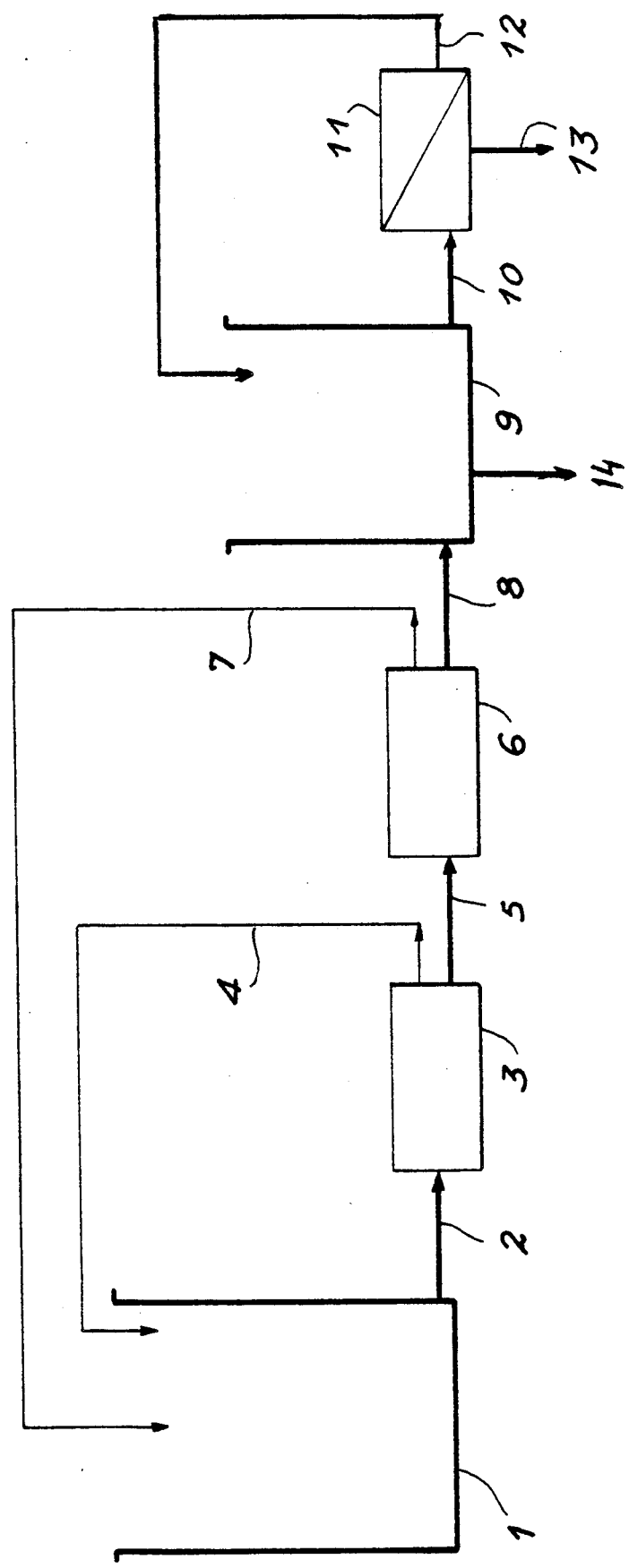

CLARIFICATION METHOD FOR GRAPE MUST, AND THE MUST THUS OBTAINED

BACKGROUND OF THE INVENTION

1. Field of the Invention

The present invention relates to a clarification method of grape must.

2. Summary of the Invention

The method according to the invention is characterized in that it consists, in a first stage, of passing the must from a vinification vat where the harvested and crushed grapes have been placed on an apparatus where the solid phase and the liquid phase of said must are separated, then sent to a flotation apparatus from which, in a clarified state, it is introduced in a vat feeding a reverse osmosis concentration apparatus, and received by recycling the concentrated must in said last apparatus.

BRIEF DESCRIPTION OF THE DRAWINGS

The figure of the accompanying drawing show through a block diagram the way the various operations of the method of the invention are carried out.

DESCRIPTION OF THE PREFERRED EMBODIMENT

The harvested grapes, picked off and crushed, are introduced in a vinification vat (1) where they are conveyed in the state of a must and via a channel (2) in an apparatus (3) adapted for effecting the separation of the solid and liquid phases forming the must.

Such an apparatus may be made for an apparatus of the type which is the object of the French patent filed by DEGREMONT on May 9, 1985 under No. 85.7026 and published under No. 2 581 559.

The separated solid phase may be recycled partly or totality by channel (4) in vinification vat (1).

The must, thus freed from the pulp, reaches via a channel (5) an enclosure (6) where the separation of the matters remaining in suspension in the must is effected by flotation. This enclosure is provided with an apparatus ensuring the production of fine bubbles of air or of an inert gas. Such an apparatus may be for example an apparatus of the type which is the object of the French patent filed by DEGREMONT on Nov. 26, 1970 under No. 70 42 486 and published under No. 2 115 053.

These matters may also as such be totally or partly returned to vat (1) via a channel (7).

When leaving flotation apparatus (6), the must, clarified, is conveyed via a channel (8) to a vat (9) partaking in the concentration and connected in turn via a channel (10) to a reverse osmosis apparatus (11).

In the latter apparatus the separation of the water, called vegetable water, is carried out which is discharged by channel (13), and of the more concentrated must returning to vat (9) via channel (12).

Finally, the concentrated must is taken off in order to be used via pipe (14).

The setting of the recycling flowrate through (12) and of the discharge flowrate through (14) allows the must concentration to rise to the level which is required.

The method according to the invention has, when compared with the standard methods for treating musts for their subsequent vinification, the following advantages:

It provides:

a continuous separation of the pulp and stones of the colloidal portion while authorizing a return of the most useful portion to the head of the vinification process, the clarification of white, red or rose musts, without addition of any other product of any nature, a substantial improvement of the quality of the musts and their concentration only by physical means.

It avoids:

any oxidation of the musts, due to the rapidity of the method which is adapted and conducted in an inert gas atmosphere is carried out, any handling and transfer of the musts.

Finally, it allows an efficient clarification with a small consumption of energy.

We claim:

1. A method for clarification and concentration of grape must comprising the steps of drawing must from a source, separating solid and liquid phases of the must, clarifying said liquid phase of said must by flotation, and concentrating said clarified liquid phase of said must by reverse osmosis, whereby there is provided concentrated must.

2. Method according to claim 1 comprising the further step of recycling said separated solid phase totally or partially to form additional must.

3. Method according to claim 2 wherein said source comprises a vinification vat, and said recycling comprises adding said separated solid phase to said vinification vat.

4. Method according to claim 1 wherein said source comprises a vinification vat and wherein said flotation clarifications step produces solid matter, and further comprising recycling said solid matters totally or partially to said vinification vat.

5. Method according to claim 1 wherein said flotation employs an inert gas.

6. Method according to claim 1 further comprising recycling said concentrated must into said clarified liquid phase must.

7. Method according to claim 1 further comprising the steps of, channeling the clarified liquid phase of said must to a concentration vat, channeling the reverse osmosised concentrated must to said vat, and wherein said concentration step is of must received from said vat which is a blend of clarified liquid phase must and concentrated must.

8. Method according to claim 1 further comprising the step of recycling and blending said concentrated must to and with said clarified must and further concentrating said blend by said reverse osmosis concentrating step, and continuously recycling and blending said further concentrated must to and with said blend until a chosen level of concentration is reached.

9. Method according to claim 8 further comprising the step of drawing off the concentrated-blend must having the chosen level of concentration.

10. Method according to claim 8 further comprising the step of adding clarified must to the blend and which forms part of the blend.

11. Method according to claim 10 comprising the step of adjusting the recycling of the blend and said adding clarified must to provide a continuous process until a chosen level of concentration is reached.

12. Method according to claim 11 comprising the step of drawing off the blend while adjusting the recycling of the blend and said adding clarified must and said drawing off to provide a continuous process with a chosen level of concentration in the drawn off blend.

13. Method according to claim 10 further comprising the step of drawing off the concentrated-blended must having the chosen level of concentration.

14. A grape must obtained by the method according to claim 1 or 6 or 8 or 12.

* * * * *